12) United States Patent
Friedman et al.

(10) Patent No.: US 8,402,537 B2
(45) Date of Patent: Mar. 19, 2013

(54) DETECTION ACCURACY TUNING FOR SECURITY

(75) Inventors: Arie Friedman, Patach-Tikva (IL); Shai Aharon Rubin, Binyamina (IL); Lior Arzi, Atlit (IL); Ron J. Karidi, Herzeliya (IL)

(73) Assignee: Microsoft Corporation, Redmond, WA (US)

( * ) Notice: Subject to any disclaimer, the term of this patent is extended or adjusted under 35 U.S.C. 154(b) by 911 days.

(21) Appl. No.: 12/238,448

(22) Filed: Sep. 26, 2008

(65) Prior Publication Data

US 2010/0083375 A1    Apr. 1, 2010

(51) Int. Cl.
G06F 11/00 (2006.01)
G06F 15/16 (2006.01)
G06F 15/173 (2006.01)

(52) U.S. Cl. ............ 726/22; 726/14; 709/224; 709/225; 709/229

(58) Field of Classification Search .......... 713/153–154, 713/187–188, 193–194; 726/11–15, 22–33, 726/1–3; 709/246–249, 11–15
See application file for complete search history.

(56) References Cited

U.S. PATENT DOCUMENTS

| 7,200,675 | B2 | 4/2007 | Wang et al. |
| 7,228,564 | B2 | 6/2007 | Raikar et al. |
| 7,359,962 | B2 | 4/2008 | Willebeek-LeMair et al. |
| 2004/0255163 | A1 | 12/2004 | Swimmer et al. |
| 2007/0300301 | A1 | 12/2007 | Cangini et al. |
| 2009/0044265 | A1* | 2/2009 | Ghosh et al. .......... 726/14 |
| 2009/0271862 | A1* | 10/2009 | Allen et al. .......... 726/22 |

OTHER PUBLICATIONS

Chyssler, et al., "Alarm Reduction and Correlation in Intrusion Detection Systems", In Proceedings of Detection of Intrusions and Malware & Vulnerability Assessment, GI SIG SIDAR Workshop (DIMVA 2004), vol. 46 of LNI, 16 pages.
Bolzoni, et al., "Atlantides: An Architecture for Alert Verification in Network Intrusion Detection Systems", Proceedings of the 21st Large Installation System Administration Conference (LISA '07), Dallas, TX: USENIX Association, Nov. 11-16, 2007, 10 pages.
Zambon, et al, "Network Intrusion Detection Systems: Fast Positive Reduction Through Anomaly Detection", Jan. 7, 2006, 21 pages.
Zhang, et al., "Network Intrusion Detection using Random Forests", In Proceedings of the Third Annual Conference on Privacy, Security and Trust, 2005, pp. 53-61.
Aria Munro, "Enhanced Steganography Detection Tool Available: Newest Version Greatly Improves Detection Accuracy", Jan. 16, 2008, 3 pages. http://enewschannels.com/2008/01/16/enc2497_001337.php.

* cited by examiner

*Primary Examiner* — Ashok Patel
*Assistant Examiner* — Evans Desrosiers

(57) ABSTRACT

Aspects of the subject matter described herein relate to tuning detection components of a security system. In aspects, a history of alerts is collected. This history is then used together with knowledge about tunable objects of the system to determine parameters of the tunable objects that can be changed to improve detection of the system. Parameters of tunable objects are adjusted in a simulator that determines an effect on alerts in the history based on the adjusted parameters. A recommendation of one or more tuning actions may be provided together with information regarding the effect of each tuning action.

18 Claims, 6 Drawing Sheets

DETECTION ACCURACY TUNING FOR SECURITY

BACKGROUND

Detection components in a security system analyze networks and hosts to detect machines that have been compromised by malicious activity or that are vulnerable to such compromise. Such detections are expressed as alerts about the security state of machines, user accounts, or other system assets.

A security system may raise false alerts that may cause costly manual investigation. Such alerts may happen because the system incorrectly analyzed data, because various components of the system are too sensitive, because the system is not adapted for its particular environment, or for other reasons. Manual investigation and adjustment of the detection components may involve a lot of time and effort.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to tuning detection components of a security system. In aspects, a history of alerts is collected. This history is then used together with knowledge about tunable objects of the system to determine parameters of the tunable objects that can be changed to improve detection of the system. Parameters of tunable objects are adjusted in a simulator that determines an effect on alerts in the history based on the adjusted parameters. A recommendation of one or more tuning actions may be provided together with information regarding the effect of each tuning action.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. Other definitions, explicit and implicit, may be included below.

Exemplary Operating Environment

Figure 1:
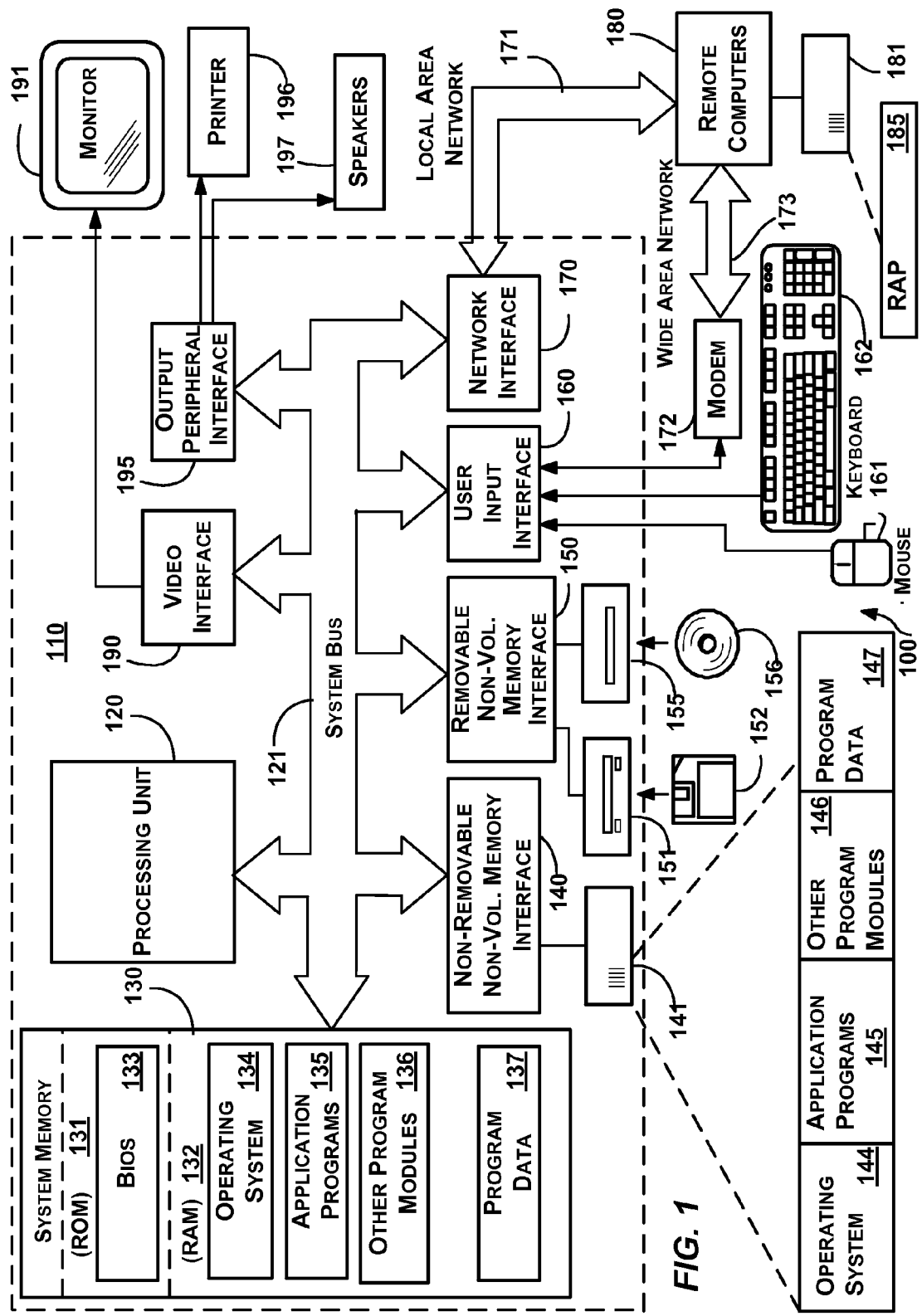
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus through a non-removable memory interface such as interface 140, and magnetic disk drive 151 and optical disc drive 155 are typically connected to the system bus by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data are given different numbers herein to illustrate that, at a minimum, they are different copies.

A user may enter commands and information into the computer 20 through input devices such as a keyboard and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Accuracy Tuning

As mentioned previously, a security system may raise false alerts. These alerts may be annoying or distracting to a system administrator, or may have undesired side effects, such as automatic actions taken by the system in response. Administrators will usually investigate each of these alerts (and in many cases may be obliged to do so for regulatory compliance). These investigations are often costly for the business operation. Eliminating these false alerts while keeping true alerts is desirable.

Below are some terms that are sometimes used herein:

A tunable object (sometimes referred to as a "detector") refers to a system component that can be configured or altered to change its behavior. For example, a tunable object may comprise a detection component. As another example, a tunable object may comprise a set of detection components. As used herein, the term component may include all or a portion of a device, one or more software components executing on one or more devices, some combination of one or more software components and one or more devices, and the like.

A tuning parameter refers to a property of a tunable object that affects its behavior. For example, for a port scan detector that fires an alert when a host contacted X or more destination IPs, the value of X may comprise a tuning parameter. As another example, a tuning parameter may control whether a tunable object is turned on or off. For a set of detection components, a flag denoting whether each component is enabled or disabled may comprise a tuning parameter.

An alert refers to a statement about the security state of an asset (e.g., machine, user account, data record, data set, application, business process, service, other asset, and the like) in a system. An alert may be generated by a detection component. For example, a port scan detector may generate an alert "host A is compromised" if a port scan originating from this host was detected.

A tuning action refers to a change in the value of a tuning parameter. Executing a tuning action will influence future alerts that are generated by the tunable object. The impact on future alerts may be evaluated by considering the impact of this change on previously observed alerts. For example, raising the threshold of a tuning object such as a port scan detector may make it fire less frequently. Looking at the number of contacted destination IPs in previously observed port scan alerts, may be used to evaluate how many alerts would have "disappeared" if the threshold was higher.

Figure 2:
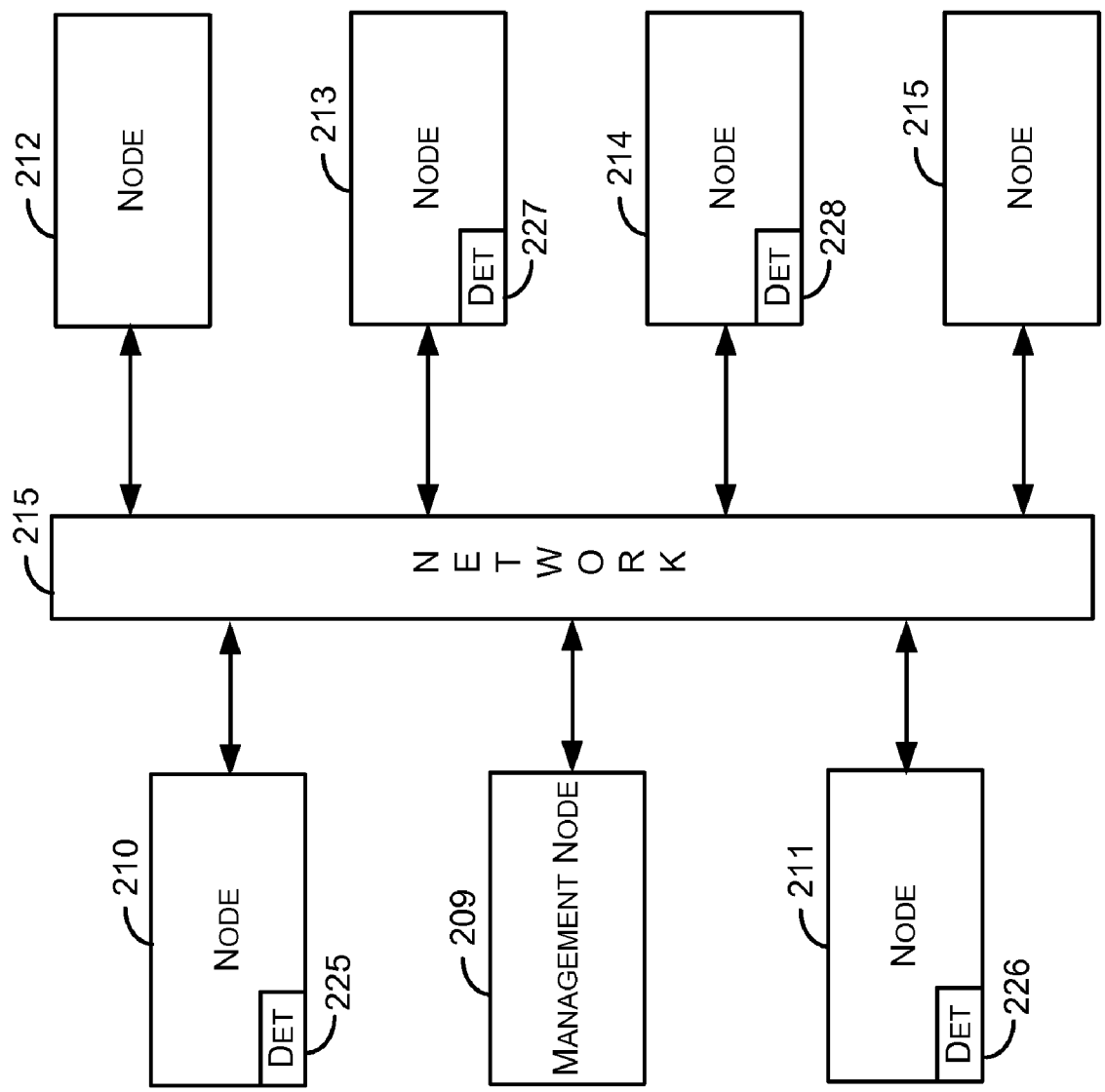
FIG. 2 is a block diagram representing an exemplary environment in which aspects of the subject matter described herein may be implemented.

FIG. 2 is a block diagram representing an exemplary environment in which aspects of the subject matter described herein may be implemented. The environment may include various nodes 209-215, a network 215, and may include other entities (not shown). The various entities may be located relatively close to each other or may be distributed across the world. The various entities may communicate with each other via various networks including intra- and inter-office networks and the network 215.

In an embodiment, the network 215 may comprise the Internet. In an embodiment, the network 215 may comprise one or more local area networks, wide area networks, direct connections, virtual connections, private networks, virtual private networks, some combination of the above, and the like.

The nodes 209-215 may comprise network devices, network appliances, workstations, servers, other computing devices, and the like. The nodes 209-215 may be implemented on special purpose or general purpose devices (e.g., the computer 110 as described in conjunction with FIG. 1). Each node may include zero or more detectors (e.g., detectors 225-228).

A detector detects data or behavior that may indicate whether an asset (local or remote) has been comprised by malicious or other activity. A detector is a tunable object that may have one or more tuning parameters. A detector may generate an alert that is sent to the management node 209.

The management node 209 may have facilities for setting tuning parameters of the detectors 225-228. The management node 209 may also provide output to a system administrator or the like in the form of alerts and other information about the security state of the nodes 210-215. The management node 209 may include a history component that stores history information about received alerts. The management node 209 may include a simulation component that determines how changing one or more tuning parameters would affect alert generation. The simulation component may use the history information together with knowledge about the tuning parameters and behavior of the detectors 225-228 to determine how changing one or more tuning parameters would affect alert generation.

Although the environment described above includes a management node and six other nodes, it will be recognized that more, fewer, or a different combination of these entities and others may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Figure 3:
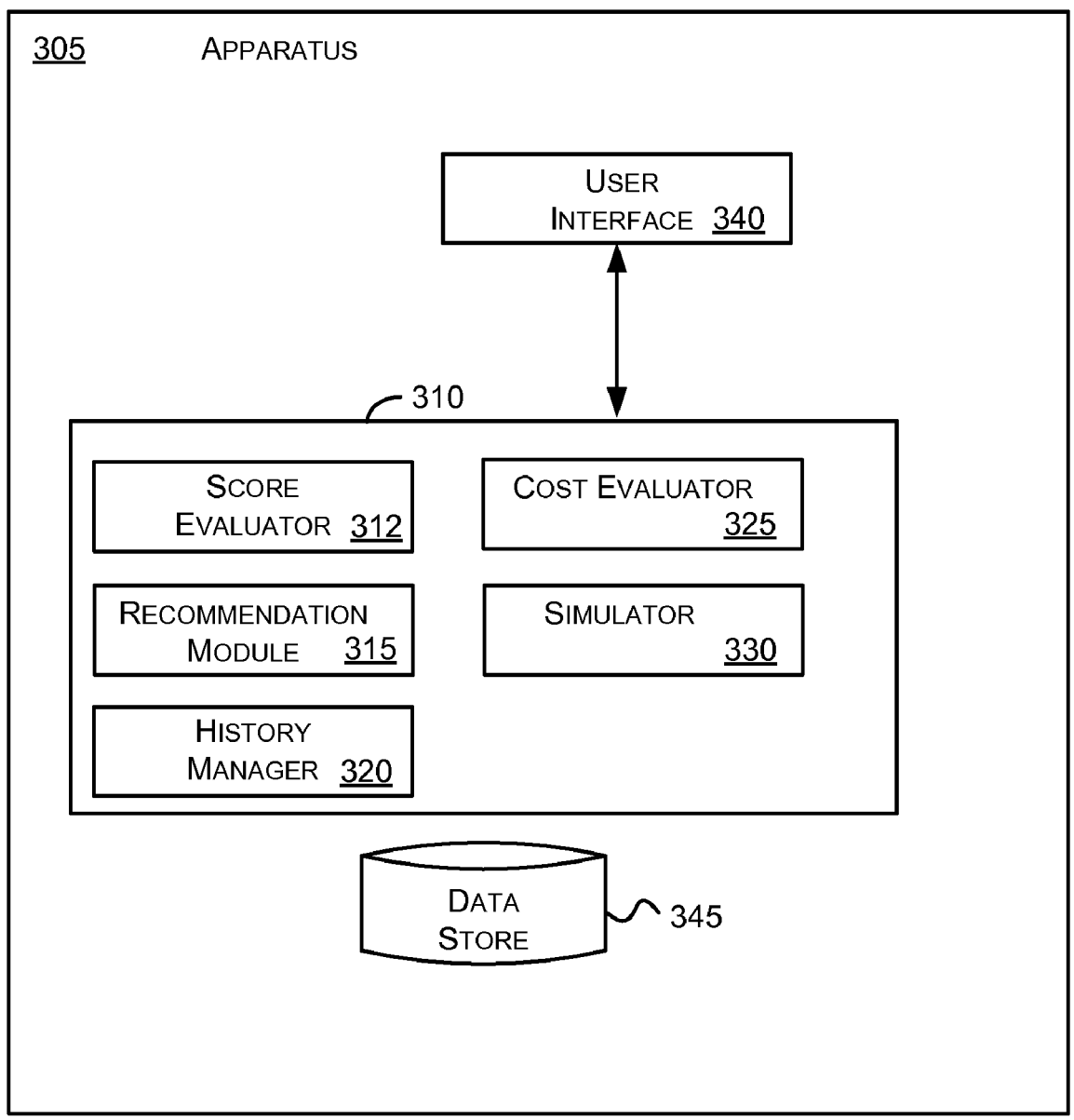
FIG. 3 is a block diagram illustrating an apparatus configured as a management node in accordance with aspects of the subject matter described herein.

FIG. 3 is a block diagram illustrating an apparatus configured as a management node in accordance with aspects of the subject matter described herein. The components illustrated in FIG. 3 are exemplary and are not meant to be all-inclusive of components that may be needed or included. In other embodiments, the components or functions described in conjunction with FIG. 3 may be included in other components, placed in subcomponents, or distributed across multiple devices without departing from the spirit or scope of aspects of the subject matter described herein.

Turning to FIG. 3, the apparatus 305 may include a user interface 340, security management components 310, and a data store 345. The security management components 310 may include a score evaluator 312, a recommendation module 315, a history manager 320, a cost evaluator 325, and a simulator 330. Although in one embodiment, the security management components 310 may reside on the apparatus 305, in other embodiments, one or more of these components may reside on other devices. For example, one or more of these components may be provided as services by one or more other devices. In this configuration, the apparatus 305 may cause the functions of these components to be performed by interacting with the services on the one or more other devices and providing pertinent information.

The score evaluator 312 is operable to determine a score associated with making an adjustment to a tunable object. A score may include the benefits from removing false positive alerts or generating true alerts that are missed by a security system, and the costs involved with making the adjustment.

The recommendation module 315 is operable to provide a recommendation regarding an adjustment to a tunable object. The recommendation may indicate the tunable object, a parameter of the tunable object to adjust, a value to which to adjust the parameter of the tunable object, a number of true positive alerts that would not have been generated by making the adjustment, a number of false negative diagnoses that would not have occurred by making the adjustment, and a score corresponding to the adjustment.

The history manager 320 is operable to store and provide access to history information that includes alerts and other security information generated by a security system. The history manager 320 may store the history information in the data store 345 and may retrieve history information from the data store 345 as needed.

The data store 345 comprises any storage media capable of storing data useful in tuning a security system. For example, the data store 345 may store information regarding alerts that were previously generated by the security system. This information may include a tunable object that sent the alert as well as a description of the alert, for example. The data store 345 may also store other information useful in determining candidate alerts that were not generated (e.g., because they did not pass a pre-defined threshold). These types of alerts are sometimes referred to as "false negative alerts" (even though technically an alert is never generated) or "false negative diagnoses."

The term data is to be read broadly to include anything that may be stored on a computer storage medium. Some examples of data include information, program code, program state, program data, rules, history information, other data, and the like. The data store 345 may comprise a file system, database, volatile memory such as RAM, other storage, some combination of the above, and the like and may be distributed across multiple devices. The data store 345 may be external or internal to the apparatus 305.

The cost evaluator 325 is operable to determine a cost associated with making an adjustment to a tuning object. A cost may be based on turning on or off a detector, changing the sensitivity of the detector, on true positive alerts missed by making an adjustment, on false positive alerts introduced by making the adjustment, on other factors, on a combination or formula involving one or more of the above, and the like.

The simulator 330 is operable to determine an effect of making an adjustment to a tunable object of the security system. An estimated effect may include, for example, the number of the alerts (false positive, true positive, etc.) that would be missing in the history information had the adjustment been made prior to the history information being generated.

The user interface 340 comprises one or more software components that allow a user to interact with the security management components 310. For example, the user interface 340 may be operable to receive a definition of a cost of adjusting a parameter of a tunable object. The definition may indicate a value that is usable (e.g., in a calculation as previously indicated) to determine the cost of making the adjustment to the tunable object.

A system administrator or the like may define a score function that gives a value for changing one or more tuning parameters. The score function may be defined as score=f($x_1$, $x_2$, ..., $x_n$), where $x_1$, $x_2$, ..., $x_n$ represent various parameters and n>=1. Some parameters that the score function may operate on include benefits and costs of making an adjustment. The operations the score function may perform may include subtracting the costs from the benefits, dividing the benefits by the costs, or other operations that include the benefits, costs, or other parameters.

The score function may use the simulator 330 and the history manager 320 to determine, for example, numbers of false positive alerts and true positive alerts that would be missing from the generated alerts if the one or more tuning parameters had been adjusted prior to the history of alerts being generated. One or more of these numbers may influence the function. For example, removing a false alert may increase the value the score function returns while removing a true alert may decrease the value.

Removing false alerts may be given a smaller or greater weight than removing true alerts. For example, the score function may add one for each false alert removed while subtracting five for each true alert removed.

The score function may also depend on whether a detector is turned on or off and/or whether a tuning parameter of the detector is adjusted. For example, negative weight (e.g., a cost) may be associated with turning a detector off so that there is a bias to keep detectors on. As another example, a negative weight may be associated to decreasing the sensitivity of a detector (e.g., changing a threshold of the detector) as the detector may miss more true positives as its sensitivity decreases.

Some examples of evaluating exemplary score functions are provided below. It is to be understood, however, that the score functions described below are not intended to be all-inclusive or exhaustive of what score functions an administrator may define. In practice, for example, an administrator may define virtually any type of score function that may depend on the parameters mentioned above and/or other parameters.

In one example, a detector may comprise a horizontal port scanner detector. A horizontal port scanner attempts to search one or more network hosts for ports that are accepting connections on the same port number. A horizontal port scanner may be characterized in that it makes several attempts during a short period of time to contact ports on other hosts. A horizontal port scanner detector may detect a horizontal port scanner based on port numbers that are contacted and a number of destination hosts that are contacted on the same destination port number within a period of time.

An exemplary horizontal port scanner detector may include two parameters:

1. A list of destination ports that are to be ignored. For example, TCP port 80 is used for contacting hosts on the Internet for Web surfing. Extensive use of TCP port 80 does not necessarily imply that a horizontal port scanner is scanning for open ports.

2. A threshold $t_h$. If the number of destination hosts (e.g., as determined by destination IP address) which a host contacts on the same port during a given period of time exceeds $t_h$, then the detector fires an alert. Initially, $t_h$ may be set to 20.

An administer may define exemplary cost functions for this detector as follows:

1. Cost(destinationPort)=5. In other words, the cost of ignoring messages to a particular destination port is 5.

2. Cost(raise threshold by x)=$x^2$. In other words, if the sensitivity of the detector is decreased by x (e.g., by increasing the threshold of $t_h$ by x), the cost is $x^2$.

Accumulated alerts during a designated period may be stored by the history component. If the security system was recently installed, there may be no or little feedback on which alerts are false positives and which alerts are true positives. In such cases, all alerts may be treated as false positives.

A score function may be defined that gives a positive value (e.g., benefits) for each false alert removed while assigning negative values (e.g., costs) for each tuning parameter adjusted in accordance with the cost functions indicated above. To determine a tuning action to take, the simulator may be invoked to determine the effect of ignoring a particular destination port and/or raising a threshold. For example:

If during the period there were 10 (false positive) alerts about horizontal port scanning on destination TCP port 20713, then the score of the tuning action "add TCP port 20713 to horizontal port scan ignored ports" is: Score=(number of removed alerts)−Cost(port)=10−5=5.

If during the period there were 20 (false positive) alerts about horizontal port scanning in which fewer than 25 distinct destination IPs were contacted, then the score of the tuning action "increase the threshold of horizontal port scan to 25 (i.e., increase it by 5)" is: Score=(number of removed alerts)−Cost(threshold+5)=20−($5^2$)=20−25=−5.

Similarly, the scores of other tuning actions, relating to detectors in the systems, may also be evaluated. The tuning action that scored the highest may be chosen and recommended to a system administrator or to an automatic process that acts on the recommendations. The alerts related to this action may then be removed from the history (or flagged), and the process may then be repeated. The score of each tuning action on the remaining alerts may then be evaluated.

In one embodiment, the process above may continue until there are no additional tuning actions with a positive score. In another embodiment, the process above may continue until a different "stop point" is reached. For example, the process above may continue until a set number of tuning actions have been recommended. As another example, the process above may continue until the recommended tuning actions would result in a selected percentage of the alerts being removed. As yet another example, the process above may continue as long as the ratio between benefits and costs is above a selected threshold. The "stop point" examples provided above are not intended to be all-inclusive or exhaustive. Indeed, based on the teachings herein, those skilled in the art may recognize many other stop points that may be employed without departing from the spirit or scope of aspects of the subject matter described herein.

Below is an exemplary algorithm in accordance with aspects of the subject matter described herein. As inputs over a given period of time in which alert data is collected, the algorithm may receive one or more of the following:

1. A list of true positive alerts (sometimes referred to as $L_{TP}$).

2. A list of false positive alerts (sometimes referred to as $L_{FP}$). All alerts may be assumed to be false positive alerts in some circumstances. For example, when a security system is first brought on line, all alerts may be assumed to be false positive.

3. A list of tunable objects and their tuning parameters (P). For each tuning parameter there is an associated cost function (e.g., CostP( )) that takes a parameter value as its input. The cost may reflect how many false positives alerts need to be suppressed to justify the tuning action. The cost allows the administrator to set priorities for use of parameters. For example, given two possible parameter changes that will have the same impact on false positives, the parameter with the lower cost will be chosen by the algorithm. The cost may also serve to prevent the algorithm from "over-fitting" the tuning actions to specific alerts. For example, the cost may be selected such that the tuning action will be executed only if it suppresses a "sufficient" number of false positives (where "sufficient" depends on the value of the cost function).

4. A goal of false positive alerts to remove. For example, a goal may include a number/percentage of false positive alerts to remove (sometimes referred to as $FP_{goal}$).

As outputs, the algorithm may provide an ordered list of recommended tuning actions. Each element of the list may include, for example:

1. The tunable object O on which the adjustment is recommended.

2. The parameter P of the tunable object on which the adjustment is recommended.

3. The value V of the parameter on which the adjustment is recommended.

4. How many true positive alerts will be affected (e.g., removed) by the adjustment.

5. How many false positive alerts will be affected (e.g., removed) by the adjustment.

6. The expected score from making the adjustment.

The algorithm may proceed as follows:

1. $Total_{FP}=0$ (number of FP alerts removed so far)

2. If the user set a value for $FP_{goal}$, and ($Total_{FP}>=FP_{goal}$), then EXIT. (i.e., exit if enough false positive alerts have already been removed).

3. For each tuning parameter in P:

A. For each possible value V of the tuning parameter:

i. $TP_V$=true positive alerts from $L_{TP}$ that will disappear if the parameter is set to V.

ii. $FP_V$=false positive alerts from $L_{FP}$ that will disappear (e.g., be missing from the history) if the parameter is set to V.

iii. $Score_V=|FP_V|-|TP_V|-Cost_P(V)$, where ($|x|$ is the number of alerts in x)

4. If $Score_V<0$ for all tuning parameters EXIT.

5. Select the tuning parameter P (belonging to tunable object O) and the value V for which the score is the highest. Output this as a recommendation, and simulate the effect of the proposed tuning action on the previously observed alerts. More specifically:

A. Output (O, P, V, $TP_V$, $FP_V$, $Score_V$)

B. Remove $TP_V$ from $L_{TP}$

C. Remove $FP_V$ from $L_{FP}$

D. $Total_{FP}=Total_{FP}+|FP_V|$

6. Go back to step 2.

Other score functions may be used in step 3.a.iii to express different preferences for the relation between false positives to false negatives. For example: $Score_V=|FP_V|/|TP_V|-Cost_P(V)$, will prefer tuning actions in which there is a higher ratio between suppressed false positives and suppressed true positives, rather than considering the absolute number of suppressed alerts.

Figure 4:
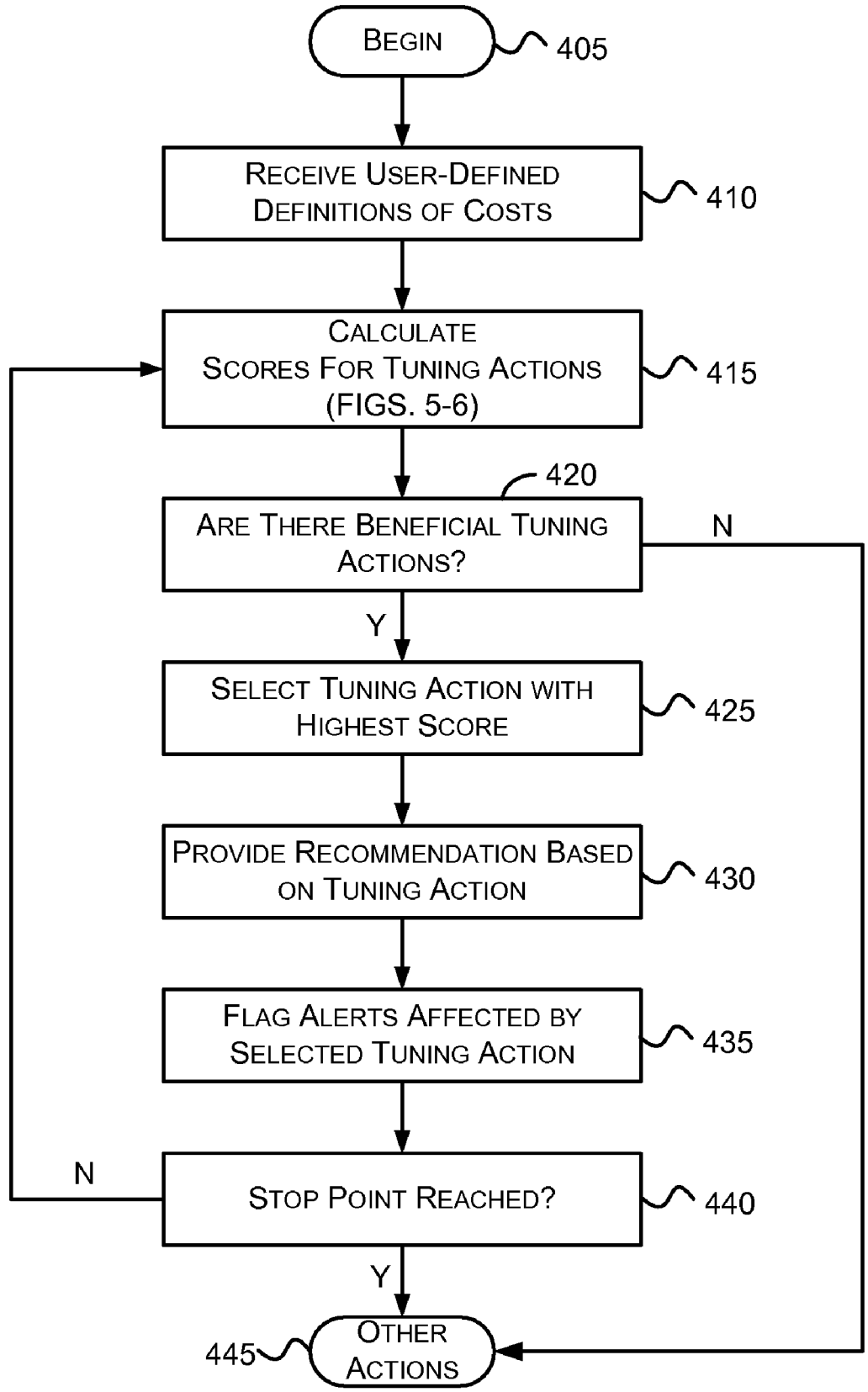
FIGS. 4-6 are flow diagrams that generally represent exemplary actions that may occur in accordance with aspects of the subject matter described herein.
Figure 5:
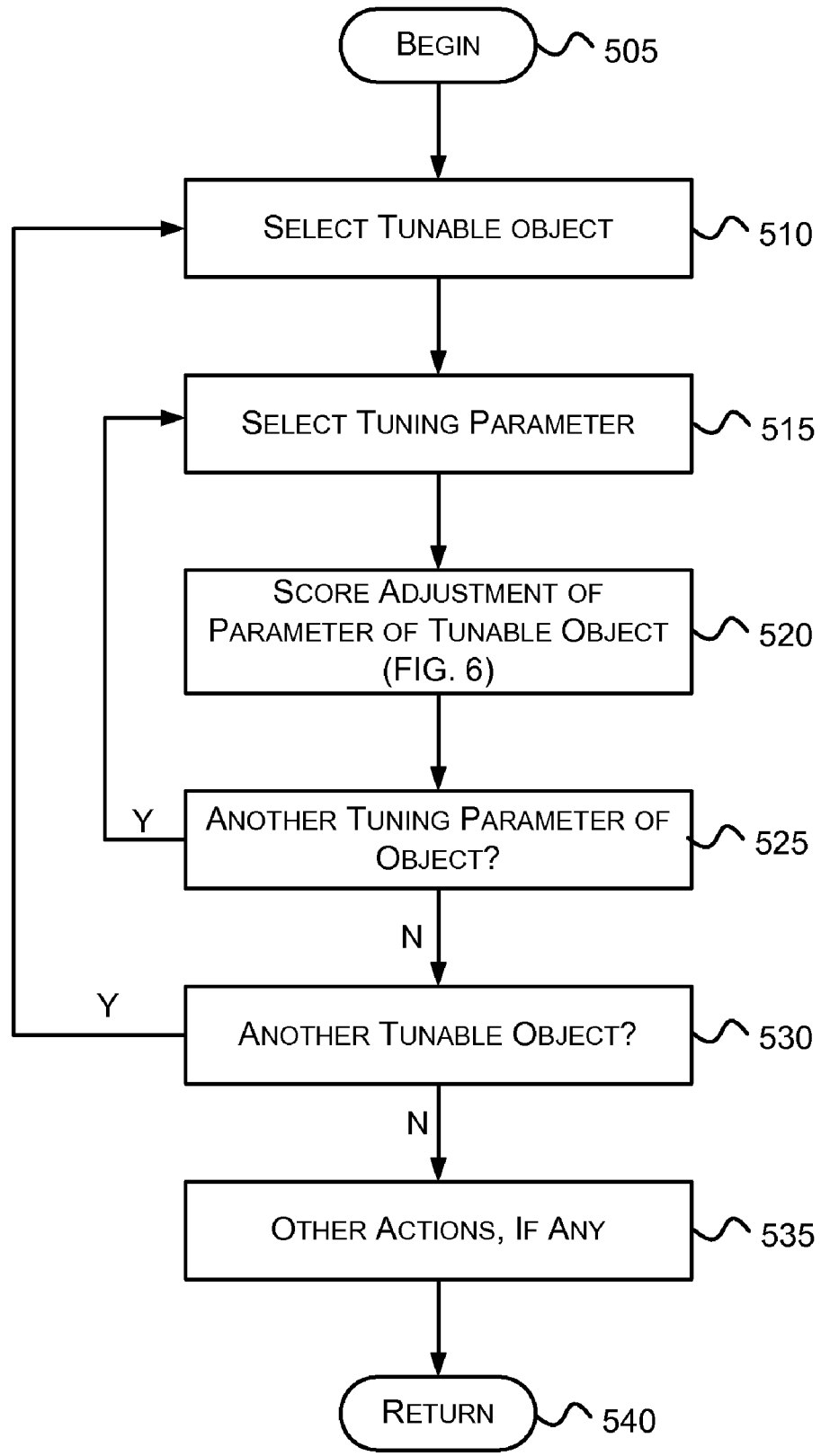
Figure 6:
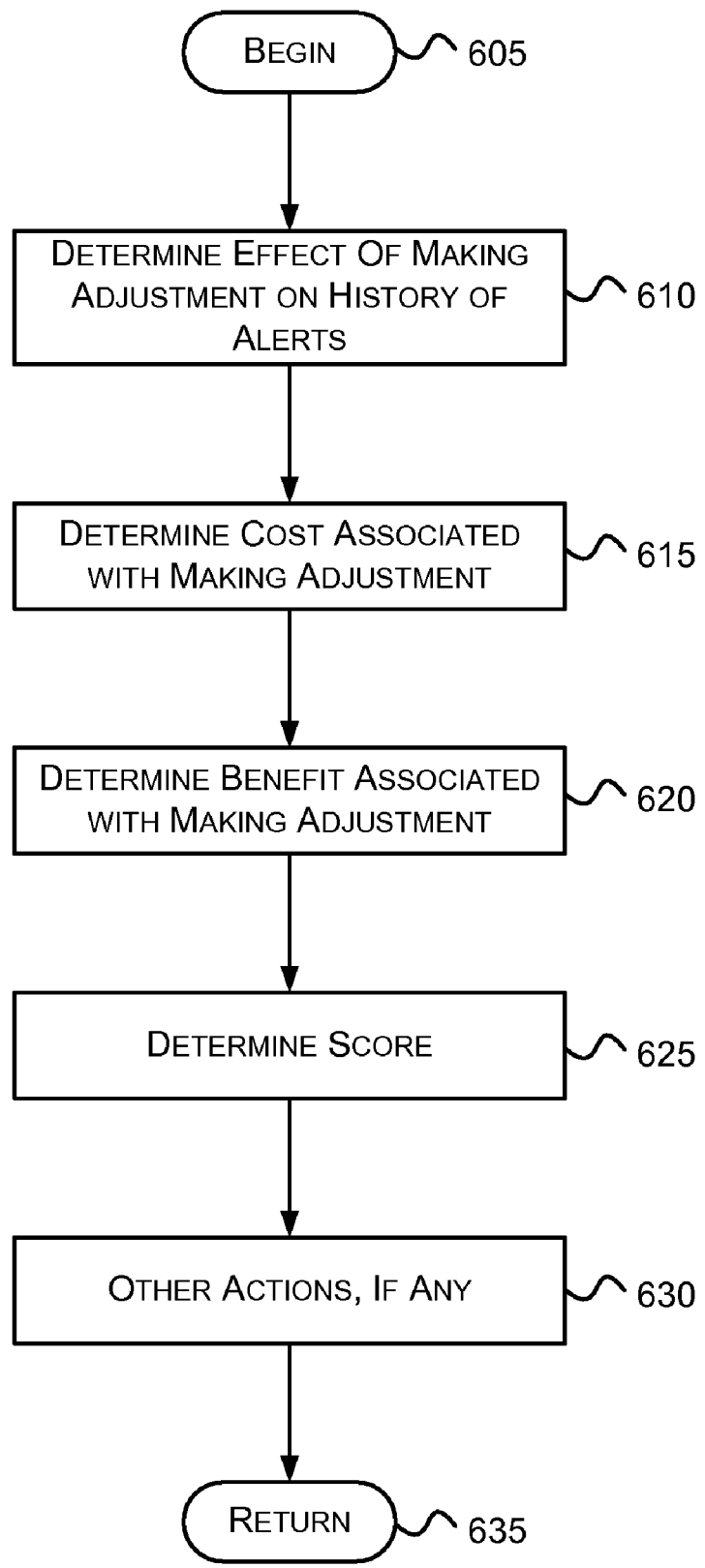

FIGS. 4-6 are flow diagrams that generally represent exemplary actions that may occur in accordance with aspects of the subject matter described herein. For simplicity of explanation, the methodology described in conjunction with FIG. 4-6 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 4, at block 405, the actions begin. At block 410, user-defined definitions of costs may be received. For example, referring to FIG. 3, a definition of cost associated with a tuning action such as disabling a port scanner detector is received via the user interface 340.

At block 415, scores for tuning actions (e.g., adjustments) are calculated as described in more detail in conjunction with FIGS. 5 and 6.

At block 420, a determination is made as to whether there are any beneficial tuning actions. If so the actions continue at block 425; otherwise, the actions continue at block 445. For example, if any of the tuning actions have a score greater than zero, there are beneficial tuning actions. As another example, if a ratio of benefits to costs is greater than a selected value, there are beneficial tuning actions.

At block 425, a tuning action with the highest score is selected. For example, referring to FIG. 3, the recommendation module 315 selects the tuning action having the highest score.

At block 430, a recommendation is provided based on the highest scoring tuning action. For example, referring to FIG. 3, the recommendation module 315 indicates "add TCP port 20713 to horizontal port scan ignored ports" and indicates a number of removed alerts for taking this action.

At block 435, alerts affected by selected tuning action are flagged. For example, referring to FIG. 305, the history manager 320 flags alerts in the history of alerts stored in the data store 345 to indicate that these alerts have been removed (e.g., are treated as if they are missing from the history of alerts) for subsequent simulation.

At block 440, whether a stop point has been reached is determined. If so, the actions continue at block 445; otherwise, the actions continue at block 415. For example, if a user indicated that the user wanted five recommendations and only four recommendations have been made, the actions continue at block 415.

At block 445, other actions, if any, occur.

Turning to FIG. 5, at block 505, the actions begin. At block 510, a tunable object is selected. For example, referring to FIG. 2, an object corresponding to the detector 228 is selected.

At block 515, a tuning parameter 515 is selected. For example, if the tunable object is a port scanner detector, the tuning parameter selected may be disabling the port scanner detector.

At block 520, adjustment of the parameter of the tunable object is scored as described in more detail in conjunction with FIG. 6.

At block 525, a whether another tuning parameter of the object exists is determined. If so, the actions continue at block 515; otherwise, the actions continue at block 530. For example, a port scanner detector may have a threshold parameter in addition to disabling a port. If so, the actions continue at block 515, where the threshold parameter is selected.

At block 530, a determination is made as to whether there is another tunable object. If so, the actions continue at block 510; otherwise, the actions continue at block 535. For example, referring to FIG. 2, a determination is made that there is another tunable object corresponding to the detector 226. This tunable object is then selected at block 510.

At block 535, other actions, if any are performed.

At block 540, the actions continue at block 420 of FIG. 4.

Turning to FIG. 6, at block 605, the actions begin. At block 610, an effect on alerts of making an adjustment to a parameter of a security system is determined. The effect may include a number of alerts (e.g., false positive) that would be missing from a history of alerts had the adjustment been made prior to the history of alerts being generated. For example, referring to FIG. 3, the simulator 330 makes an adjustment to a parameter of a tunable object and determines via the history manager 320 the effect on the history of alerts that this adjustment would have made.

At block 615, a determination is made as to a cost associated with making the adjustment. For example, referring to FIG. 3, the cost evaluator 325 determines a cost of disabling a port scanner detector. The cost evaluator 325 may use a user-defined definition of cost to make this evaluation.

At block 620, a benefit associated with making the adjustment is determined. The benefit is related to the effect on the alerts that the adjustment has. For example, referring to FIG. 3, the score evaluator 312 determines that 10 false positive alerts would be missing in the history of alerts if the port scanner detector was disabled.

At block 625, a score is determined based on the cost and benefit of making the adjustment. For example, referring to FIG. 3, the score evaluator 312 may evaluate a function that includes the costs and benefits of making the adjustment.

At block 635, other actions, if any, occur.

At block 635, the actions continue at block 525 of FIG. 5.

Aspects of the subject matter described herein may be applied in various scenarios including the following exemplary scenarios:

1. Right after a security system is installed, there may not be enough information for determining whether an alert is true or false, but it is more likely that alerts are raised due to misconfiguration rather than malicious activity. Activating the algorithm while treating all alerts as false positive may be useful for highlighting recommended configuration and tuning changes.

2. After a security system has been active for a while and feedback about the quality of the assessments has been obtained manually from an administrator or automatically by designated system components, the algorithm may be used to propose configuration changes that will improve detection accuracy.

3. The algorithm may be used to increase system sensitivity and mitigate false negatives. Although the algorithm may be used to mitigate false positive, the algorithm may also be used to mitigate false negatives. To do this, the costs given as input and the score function may be altered. For example, taking an action that increases system sensitivity (e.g. enabling an element that was previously disabled, lowering a threshold) may increase the benefit. True positive alerts that will be detected due to the change have a positive impact on benefit as well. False positive alerts caused by the tuning action reduce the benefit. Note that to make an evaluation about true and positive alerts that will be created if system sensitivity is increased, the detection components may store information also about events that did not cause alerts, for "what if" analysis (for example, events in which a measure was within a selected value of the threshold, although it did not pass the threshold).

4. Instead of using "one dimensional" parameters, the algorithm may also be given parameters that rely on several system components used in conjunction with each other. For example, in addition to checking parameter 1 and parameter 2 independently, it is possible to check also a combined parameter that sets values for parameters 1 and 2 simultaneously. In that case, many more values may need to be checked, but the tuning of the system is much more specified.

As can be seen from the foregoing detailed description, aspects have been described related to tuning detection components of a security system. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:

determining an effect on alerts of making an adjustment to a parameter of a security system by using at least a history of the alerts and simulating the effect of the adjustment to the parameter on the history of the alerts, wherein determining an effect on alerts of making an adjustment to a parameter of a security system by using at least a history of the alerts further comprises determining a number of true positive alerts that would be missing from the history of alerts had the adjustment been made prior to the history of alerts being generated, and, determining a number of false positive alerts that would have been eliminated from the history of alerts had the adjustment been made prior to the alerts being generated;

determining a cost associated with making the adjustment comprising increasing the cost based on the number of true positive alerts that would have been missing, and, decreasing the cost based on the number of false positive alerts that would have been eliminated; and determining a benefit associated with making the adjustment, the benefit related to the effect.

2. The method of claim 1, further comprising receiving a user-defined definition of the cost and wherein determining a cost associated with making the adjustment comprises evaluating the definition based on the adjustment.

3. The method of claim 2, wherein the definition indicates a value associated with disabling a tunable object of the security system.

4. The method of claim 2, wherein the definition indicates a function associated with changing a parameter of a tunable object of the security system.

5. The method of claim 1, further comprising if the benefit is greater than the cost, providing a recommendation that the parameter of the security system be adjusted.

6. The method of claim 1, further comprising finding an adjustment that has a highest score and providing a recommendation that the adjustment that has the highest score be made before other adjustments, if any, are made.

7. The method of claim 1, further comprising providing a recommendation that indicates a tunable object upon which to make the adjustment, a parameter of the tunable object to adjust, a value to which to adjust the parameter of the tunable object, the number of true positive alerts that would have been missing by making the adjustment, the number of false positive alerts that would have been missing by making the adjustment, and a score corresponding to the benefit.

8. The method of claim 1, wherein all alerts in the history of alerts are considered to be false positive alerts.

9. The method of claim 1, wherein the history of alerts includes information in which a measure was within a selectable value of, but did not pass, a threshold of an alert.

10. The method of claim 1, wherein determining an effect on alerts of making an adjustment to a parameter of a security system by using at least a history of the alerts comprises determining an effect on the alerts when two or more parameters of the security system are adjusted in conjunction with each other.

11. In a computing environment, an apparatus, comprising:
a history manager operable to store history information that includes alerts generated by a security system;
a simulator operable to determine an effect of making an adjustment to a tunable object of the security system by using at least the history information and simulating the effect of the adjustment on the history information, wherein determine an effect of making an adjustment to a tunable object of the security system by using at least the history information comprises determine a number of the true positive alerts that would be missing in the history information had the adjustment been made prior to the history information being generated, and, determine a number of false positive alerts that would have been eliminated in the history information had the adjustment been made prior to the history information being generated;

a cost evaluator operable to determine a cost associated with making the adjustment to the tunable object including increasing the cost based on the number of true positive alerts that would be missing, and, decreasing the cost based on the number of false positive alerts that would have been eliminated; and a score evaluator operable to determine a benefit associated with making the adjustment, the benefit related to the effect.

12. The apparatus of claim 11, further comprising a recommendation module operable to provide a recommendation regarding the adjustment, the recommendation indicating the tunable object, a parameter of the tunable object to adjust, a value to which to adjust the parameter of the tunable object, the number of true positive alerts that would be missing in the history information had the adjustment been made prior to the history information being generated, the number of false positive alerts that would have been eliminated from the history information had the adjustment been made prior to the history information being generated, and a score corresponding to the benefit.

13. The apparatus of claim 11, further comprising a user interface operable to receive a definition of the cost, the definition indicating a value usable to determine the cost of making the adjustment to the tunable object.

14. The apparatus of claim 11, further comprising a recommendation module that is operable to select a highest ranked adjustment from a set of adjustments, the highest ranked adjustment being associated with a highest score determined by the score evaluator.

15. A computer storage medium, the computer storage medium not consisting of a propagating signal, the computer storage medium having computer-executable instructions, which when executed perform actions, comprising:
calculating scores for a first set of tuning actions available on a security system by simulating an effect of at least one of the first set of tuning actions, the scores being determined based at least in part on determining a number of false positive alerts that would have been eliminated had the at least one of the first set of tuning actions been made, and, determining a number of true positive alerts that would be missing had the at least one of the first set of tuning actions been made and costs associated with the tuning actions, wherein the score is decreased based on the number of true positive alerts that would have been missing, and, the score is increased based on the number of false positive alerts that would have been eliminated;

determining if any of the first set of tuning actions are beneficial based on the scores;

selecting a tuning action with a highest score, and providing a recommendation based on the tuning action with the highest score.

16. The computer storage medium of claim 15, further comprising:
flagging alerts of a history of alerts that would be missing if the tuning action with the highest score had been performed prior to the alerts being generated;

calculating additional scores for a second set of tuning actions that are available on the security system, the additional scores determined based at least in part on a number of false positive alerts and costs associated with non-flagged alerts;

determining if any of the second set of tuning actions are beneficial based on the additional scores;

selecting an additional tuning action with a highest score of the second set of tuning actions; and providing an additional recommendation based on the additional tuning action.

17. The computer storage medium of claim 15, wherein the scores being determined based at least in part on a number of false positive alerts and costs associated with the tuning actions comprises determining each score based at least in part on a number of false positive alerts that its associated tuning action would have eliminated from a history of alerts if the tuning action had been performed prior to the alerts being generated.

18. The computer storage medium of claim 15, further comprising receiving user input that defines the costs associated with the tuning actions, a cost reducing a benefit of performing a tuning action.

* * * * *